(12) United States Patent
Takaki et al.

(10) Patent No.: US 7,538,809 B2
(45) Date of Patent: May 26, 2009

(54) CCD PULSE GENERATOR

(75) Inventors: Kouichi Takaki, Tokyo (JP); Hiroyuki Yamamoto, Tokyo (JP); Takeshi Yoshino, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 991 days.

(21) Appl. No.: 10/780,604

(22) Filed: Feb. 19, 2004

(65) Prior Publication Data

US 2004/0165072 A1 Aug. 26, 2004

(30) Foreign Application Priority Data

Feb. 20, 2003 (JP) .............................. 2003-042279

(51) Int. Cl.
*H04N 3/14* (2006.01)
*H04N 5/335* (2006.01)
(52) U.S. Cl. .................................... 348/294; 348/222.1
(58) Field of Classification Search ........................ None
See application file for complete search history.

(56) References Cited

U.S. PATENT DOCUMENTS

| 5,686,850 | A | * | 11/1997 | Takaki et al. ................. 327/261 |
| 5,847,588 | A | * | 12/1998 | McDermott .................. 327/144 |
| 6,285,399 | B1 | * | 9/2001 | Tao ............................. 348/312 |
| 6,580,456 | B1 | * | 6/2003 | Jacobs ......................... 348/312 |

FOREIGN PATENT DOCUMENTS

| JP | 06-125247 | 5/1994 |
| JP | 06-233197 | 8/1994 |
| JP | 07-143405 | 6/1995 |
| JP | 10-190419 | 7/1998 |
| JP | 10-304252 | 11/1998 |
| JP | 2000-078481 | 3/2000 |
| JP | 2000-151899 | 5/2000 |
| JP | 2000-224490 | 8/2000 |
| JP | 2001-285705 | 10/2001 |
| JP | 2001-358902 | 12/2001 |
| JP | 2002-016492 | 1/2002 |

OTHER PUBLICATIONS

Japanese Office Action dated Jun. 24, 2008 issued by the Japanese Patent Office in a Corresponding Application.

* cited by examiner

*Primary Examiner*—Sinh Tran
*Assistant Examiner*—Yogesh Aggarwal
(74) *Attorney, Agent, or Firm*—Finnegan, Henderson, Farabow, Garrett & Dunner, L.L.P.

(57) ABSTRACT

This invention relates to a CCD pulse generator capable of generating a CCD driving signal and CCD output processing signal at accurate timings. The pulse generator includes a digital delay type pulse control section which finely delays a transfer signal for driving a CCD, thereby generating a plurality of delay signals, and changes selection of these delay signals, thereby generating a CCD driving signal and/or CCD output processing signal corresponding to set rise and fall timings, an inverted/non-inverted signal generating section which generates the inverted signal and non-inverted signal of the generated signal, a selection section which selects the inverted signal and non-inverted signal of the generated signal, a blanking section which temporarily disables the generated signal, an output section which has an output enable function and outputs the signal selected by the selection section, and an output signal condition setting section which sets pieces of condition setting information that determine the operations of the respective sections.

22 Claims, 6 Drawing Sheets

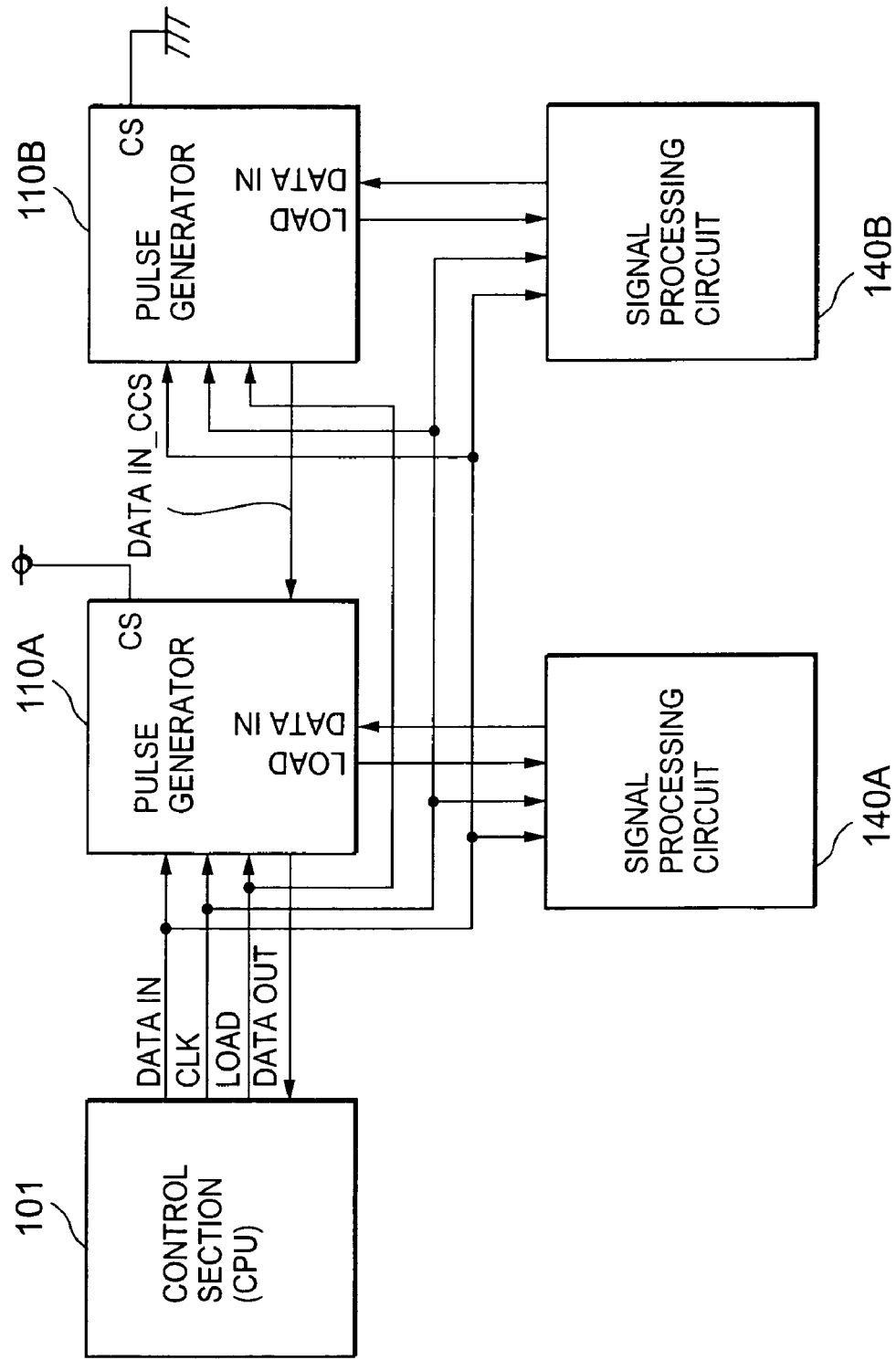

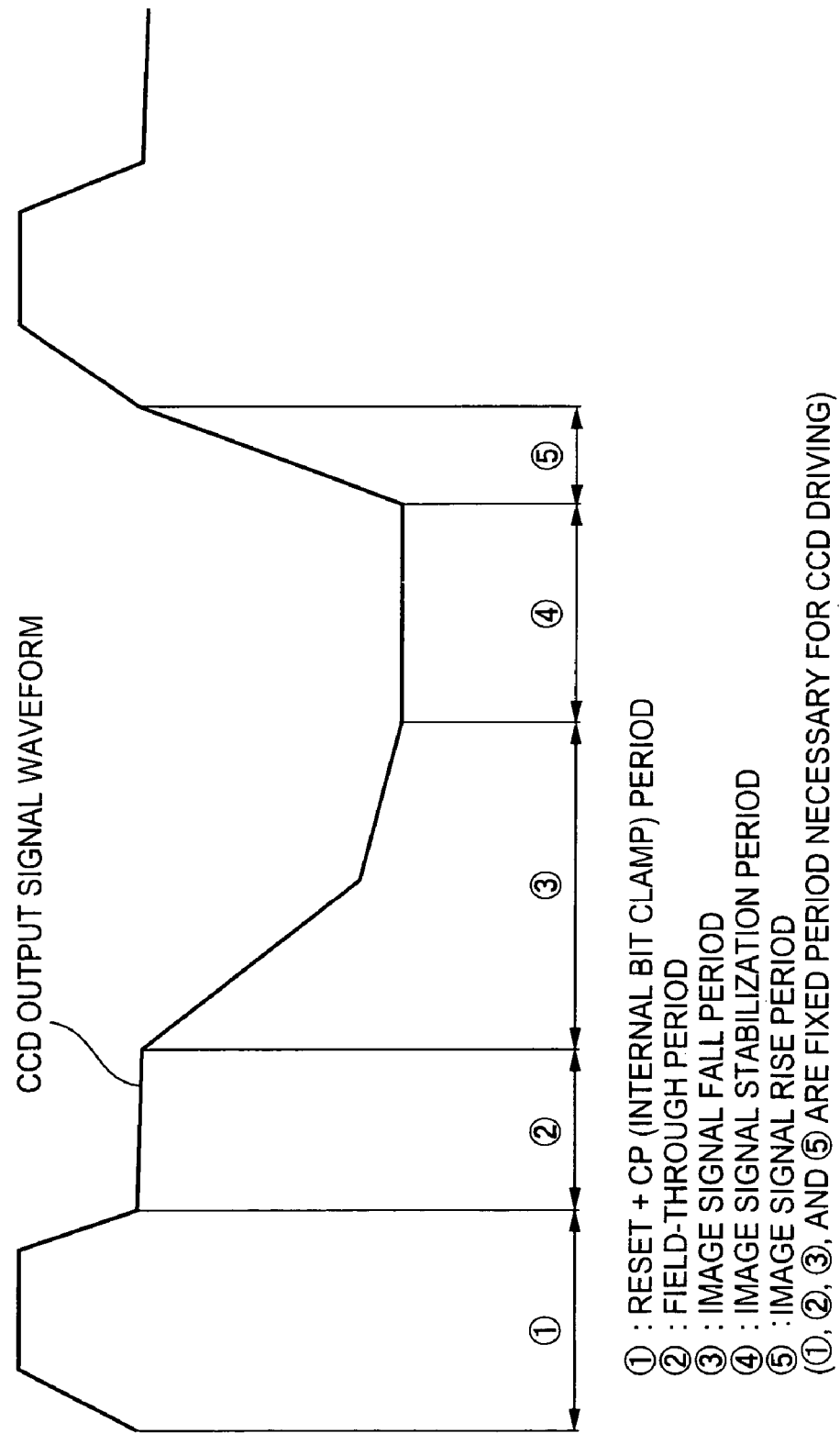

CCD PULSE GENERATOR

BACKGROUND OF THE INVENTION

1. Field of the Invention

The present invention relates to a pulse generator which generates a CCD driving signal for driving a CCD and a CCD output processing signal for processing a CCD output signal (these two signals will be referred to as CCD control signals hereinafter) and, more particularly, to a pulse generator capable of accurate timing control of each signal.

2. Description of the Prior Art

The generating timings of signals necessary for driving and output signal processing of a CCD serving as the heart of an image reading apparatus are very important to obtain a high-quality image signal.

The signal generating timing relationship has conventionally been ensured by applying the delay characteristic of a gate circuit or inverter circuit, or using a relatively low-cost semiconductor delay element.

In conventional image reading apparatuses using line CCDs, CCDs of the same type (line sensors) are commonly adopted for high- to low-speed reading apparatuses, and large part of the circuit arrangement is kept unchanged. In practice, no circuits are common because of a change in the timing setting circuit.

Japanese Unexamined Patent Publication No. 5-275988 (see p. 1 and FIG. 1) discloses a pulse generating circuit which can be used as a pulse generator.

In recent years, demands have arisen for increasing the speed and resolution of image reading apparatuses. Along with this, the CCD driving speed also increases.

For example, a fixed period necessary to drive a CCD exists in a CCD output signal, and limits the effective period of the CCD output signal serving as an image signal. The effective period becomes narrower for higher-speed driving, and it becomes difficult to control the sampling timing of the CCD output signal.

FIG. 6 is a waveform chart showing an example of the waveform of a CCD output signal. FIG. 6 shows an example of the waveform for one pixel. The period during which the CCD output signal can be sampled and held as an image signal is limited to an image signal stabilization period ④ in FIG. 6. For example, one cycle from ① to ⑤ for a read frequency (CCD transfer signal frequency) of 20 MHz is 50 ns. A reset period+clamp period ① is about 20 ns at minimum due to CCD driving specifications. A field-through period ② is set to 0 ns by controlling the timings of a transfer clock and reset pulse in order to ensure an image stabilization period in high-speed driving at the reference level of correlated sampling. An image signal fall period ③ is influenced by the tr and tf of the transfer clock, and must be about 15 ns in general. Similarly, an image signal rise period ⑤ must be about 5 ns in general.

The remaining image signal period ④ is tw④=50−①−②−③−⑤=50−20−0−15−5=10, i.e., 10 ns. Even during the 10-ns period, the sample-and-hold point of a signal exists. An optimal sample-and-hold point is one at which a maximum amplitude is resultantly obtained and the noise amount minimizes. This point exists at latter part of the image signal stabilization period ④, but if the point comes too closer to the period ⑤, noise increases.

As described above, control of the sample-and-hold timing of a CCD output signal is critical, and becomes more critical for higher-speed driving.

For this purpose, high-speed or high-resolution image reading apparatuses have to use expensive, high-precision delay elements in order to generate CCD driving signals (CCD reset signal, CCD clamp signal, spare signal, and the like) and CCD output processing signals (sampling signal and the like) at accurate timings.

Due to variations between apparatuses, the apparatuses may not operate in a design state. Some apparatuses take an apparatus arrangement in which the delay state of a high-precision delay element is controlled using a jumper switch or the like.

CCDs of the same type are commonly adopted for high- to low-speed reading apparatuses, and large part of the circuit arrangement is kept unchanged. In practice, no circuits can be common because of a change in the timing setting circuit.

SUMMARY OF THE INVENTION

The present invention has been made to overcome the conventional drawbacks, and has as its object to provide a CCD pulse generator capable of generating a CCD driving signal and CCD output processing signal at accurate timings.

The present inventors have newly found that the above object can be achieved by controlling the timings of a CCD driving signal and CCD output processing signal using a digital delay type delay signal generating section comprised of a combination of inverter circuits (a digital delay type signal generating circuit which finely delays a transfer signal serving as a reference clock to generate a plurality of delay signals, and changes selection of these delay signals to generate a CCD reset signal corresponding to set rise and fall timings).

More specifically, a reset signal and clamp signal are generated as CCD driving signals for driving a CCD using the transfer signal as a reference. A sampling signal is generated as a CCD output processing signal for processing a CCD output. The timing of a spare signal is further controlled by the delay signal generating section comprised of the combination of inverter circuits. These signals are output from one integrated circuit. The timings, pulse widths, characteristics, and output control of these signals can be concentratedly controlled by an output signal condition setting section comprised of one register.

In order to achieve the above object, according to the first aspect of the present invention, there is provided a CCD pulse generator comprising a digital delay type CCD reset signal generating section which finely delays a transfer signal for driving a CCD, thereby generating a plurality of delay signals, and changes selection of the plurality of delay signals, thereby generating a CCD reset signal corresponding to set rise and fall timings, an inverted/non-inverted signal generating section which generates an inverted signal and a non-inverted signal of the CCD reset signal, a selection section which selects the inverted signal and the non-inverted signal of the CCD reset signal, a blanking section which temporarily disables the CCD reset signal, an output section which has an output enable function and outputs the signal selected by the selection section, and an output signal condition setting section which sets pieces of condition setting information that determine the operations of the respective sections.

In order to achieve the above object, according to the second aspect of the present invention, there is provided a CCD pulse generator comprising a digital delay type CCD clamp signal generating section which finely delays a transfer signal for driving a CCD, thereby generating a plurality of delay signals, and changes selection of the plurality of delay signals, thereby generating a CCD clamp signal corresponding to set rise and fall timings, an inverted/non-inverted signal generating section which generates an inverted signal and a non-inverted signal of the CCD clamp signal, a selection section which selects the inverted signal and the non-inverted signal of the CCD clamp signal, a blanking section which temporarily disables the CCD clamp signal, an output section which has an output enable function and outputs the signal selected by the selection section, and an output signal condition setting section which sets pieces of condition setting information that determine the operations of the respective sections.

In order to achieve the above object, according to the third aspect of the present invention, there is provided a CCD pulse generator comprising a digital delay type CCD spare signal generating section which finely delays a transfer signal for driving a CCD, thereby generating a plurality of delay signals, and changes selection of the plurality of delay signals, thereby generating a CCD spare signal corresponding to set rise and fall timings, an inverted/non-inverted signal generating section which generates an inverted signal and a non-inverted signal of the CCD spare signal, a selection section which selects the inverted signal and the non-inverted signal of the CCD spare signal, a blanking section which temporarily disables the CCD spare signal, an output section which has an output enable function and outputs the signal selected by the selection section, and an output signal condition setting section which sets pieces of condition setting information that determine the operations of the respective sections.

In order to achieve the above object, according to the fourth aspect of the present invention, there is provided a CCD pulse generator comprising a digital delay type sampling signal generating section which finely delays a transfer signal for driving a CCD, thereby generating a plurality of delay signals, and changes selection of the plurality of delay signals, thereby generating a sampling signal for sampling a CCD output in synchronism with set rise and fall timings, an inverted/non-inverted signal generating section which generates an inverted signal and a non-inverted signal of the sampling signal, a selection section which selects the inverted signal and the non-inverted signal of the sampling signal, an output section which has an output enable function and outputs the signal selected by the selection section, and an output signal condition setting section which sets pieces of condition setting information that determine the operations of the respective sections.

In order to achieve the above object, according to the fifth aspect of the present invention, there is provided a CCD pulse generator comprising a digital delay type CCD spare signal generating section which finely delays a transfer signal for driving a CCD, thereby generating a plurality of delay signals, and changes selection of the plurality of delay signals, thereby generating another CCD spare signal corresponding to set rise and fall timings, an inverted/non-inverted signal generating section which generates an inverted signal and a non-inverted signal of the CCD spare signal, a selection section which selects the inverted signal and the non-inverted signal of the CCD spare signal, an output section which has an output enable function and outputs the signal selected by the selection section, and an output signal condition setting section which sets pieces of condition setting information that determine the operations of the respective sections.

According to the sixth aspect of the present invention, there is provided a CCD pulse generator wherein the output signal condition setting section defined in the first to fifth aspects is formed by a register which is controlled by three, data, clock, and load control signals.

According to the seventh aspect of the present invention, there is provided a CCD pulse generator wherein the output signal condition setting section defined in the sixth aspect is formed by a register which is controlled by three, data, clock, and load control signals, and can be cascade-connected to another functional element section formed by a register which is controlled by three, data, clock, and load control signals.

According to the eighth aspect of the present invention, there is provided a CCD pulse generator wherein the register defined in the sixth or seventh aspect is controlled via a terminal for selecting an element operation order.

According to the ninth aspect of the present invention, there is provided a CCD pulse generator wherein the register defined in the sixth or seventh aspect is controlled via a terminal for element enable selection.

According to the 10th aspect of the present invention, there is provided a CCD pulse generator wherein the register defined in the sixth or seventh aspect is controlled via communication by a setting section including a CPU.

According to the 11th aspect of the present invention, there is provided a CCD pulse generator wherein the respective sections defined in the sixth aspect are arranged in one chip of an integrated circuit.

According to the 12th aspect of the present invention, there is provided a pulse generator unit which is formed by combining at least two of pulse generators defined in the first to fifth aspects and comprises a plurality of output sections, wherein all output enable functions of the output sections are simultaneously controlled by one setting.

According to the 13th aspect of the present invention, there is provided a CCD pulse generator wherein the transfer signal defined in the first to fifth aspects is received by a differential input section to generate the plurality of delay signals.

According to the 14th aspect of the present invention, there is provided a CCD pulse generator wherein the respective sections defined in the first to third aspects are arranged in one chip of an integrated circuit, the blanking section comprises an internal blanking signal generating section which generates a blanking signal within the integrated circuit, an external blanking signal input section which receives a blanking signal outside the integrated circuit, and a blanking signal selection section which selects the internal blanking signal and the external blanking signal, and selection of the blanking signal selection section is set by the output signal condition setting section.

According to the 15th aspect of the present invention, there is provided a CCD pulse generator wherein the pulse generator defined in the first to 14th aspects generates a signal for driving a line CCD.

As is apparent from the above aspects, the present invention exhibits the following effects.

A transfer signal for driving a CCD is finely delayed to generate a plurality of delay signals, and selection of these delay signals is changed to generate CCD driving signals (CCD reset signal, CCD clamp signal, spare signal, and the like) and CCD output processing signals (sampling signal and the like) corresponding to set rise and fall timings. Thus, CCD driving signals and CCD output processing signals can be generated at accurate timings.

When CCDs of the same type are commonly adopted for high- to low-speed reading apparatuses and large part of the circuit arrangement is kept unchanged, a common timing setting circuit and common circuit can be used.

No expensive analog delay elements need be prepared, and selection of analog delay elements need not be changed by a jumper or the like.

The above and many other objects, features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIG. 5 is a block diagram showing still another connection state in the CCD pulse generator according to the present invention; and FIG. 6 is a waveform chart showing the waveform of a CCD output signal.

DETAILED DESCRIPTION OF THE PREFERRED EMBODIMENTS

A preferred embodiment of a CCD pulse generator according to the present invention will be described in detail below with reference to the accompanying drawings.

<Whole Arrangement of Image Reading Apparatus>

The whole arrangement of an image reading apparatus to which the embodiment of the CCD pulse generator according to the present invention can be applied will be explained with reference to FIG. 1.

The CCD pulse generator according to the embodiment can also be applied to an image reading apparatus which performs reading in multiple colors (e.g., three colors, red, green, and black). For descriptive convenience, an application to a monochrome image reading apparatus 100 will be described.

Figure 1:
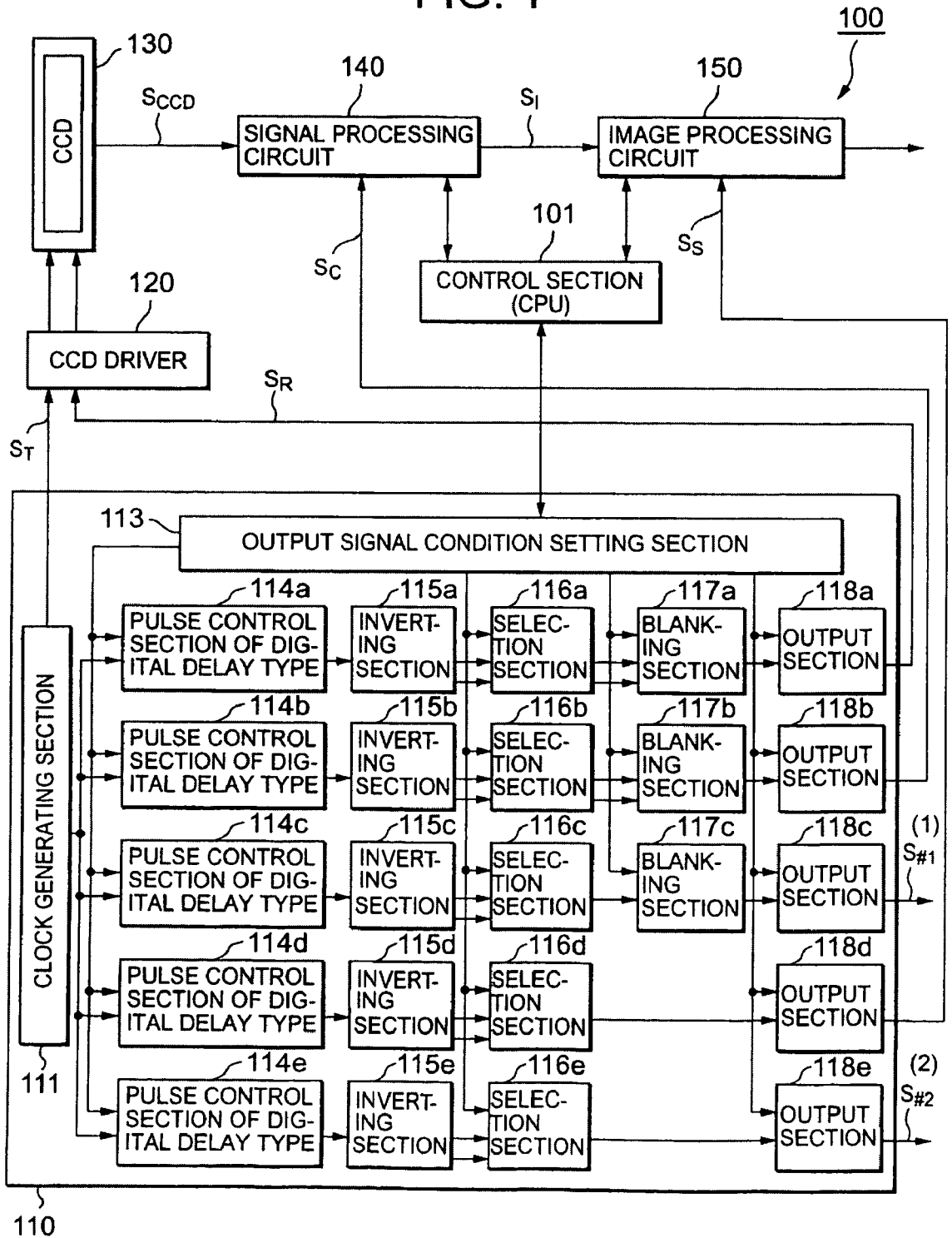
FIG. 1 is a block diagram showing the schematic mechanical arrangement of an image reading apparatus to which an embodiment of a CCD pulse generator according to the present invention is applied.

In FIG. 1, reference numeral 101 denotes a control section which is comprised of a CPU and the like for controlling each section of the image reading apparatus 100. Reference numeral 110 denotes a pulse generator which is a feature of the embodiment and adopts a digital delay method of generating a CCD driving signal and CCD output processing signal (these two signals will be referred to as CCD control signals hereinafter) at accurate timings in synchronism with set rise and fall timings.

Reference numeral 120 denotes a CCD driver which drives a CCD upon reception of a transfer signal $S_T$ and reset signal $S_R$ from the pulse generator 110. Reference numeral 130 denotes a CCD serving as an image sensing unit which is driven by the CCD driver 120 to perform photoelectric conversion. The CCD 130 may be a line sensor or two-dimensional sensor. Reference numeral 140 denotes a signal processing circuit which performs predetermined signal processing for an output signal $S_{CCD}$ from the CCD 130 using a clamp signal $S_C$, thereby generating an image signal $S_1$. Reference numeral 150 denotes an image processing circuit which performs predetermined image processing for an image signal using a sampling signal $S_S$.

The pulse generator 110 comprises building components 111 to 118e. The clock generating section 111 generates as a reference clock the transfer signal $S_T$ used for charge transfer of the CCD 130. The output signal condition setting section 113 sets pieces of condition setting information which determine the operations of the respective sections in the pulse generator 110. The pulse control sections 114a to 114e of the digital delay type finely delay the transfer signal $S_T$ for driving the CCD, thereby generating a plurality of delay signals, and change selection of these delay signals, thereby generating signals corresponding to set rise and fall timings. The inverting sections 115a to 115e generate inverted signals and non-inverted signals of outputs from the digital delay type pulse control sections 114a to 114e. The selection sections 116a to 116e select outputs (inverted signals and non-inverted signals) from the inverted sections 115a to 115e. The blanking sections 117a to 117c temporarily blank (temporarily stop) the selection results of the selection sections 116a to 116c. The output sections 118a to 118e output outputs from the blanking sections 117a to 117c or the selection sections 116d and 116e via output enable functions.

In FIG. 1, the transfer signal $S_T$ from the clock generating section 111 is supplied to the CCD driver 120. The reset signal $S_R$ from the output section 118a is supplied to the CCD driver 120. The clamp signal $S_C$ from the output section 118b is supplied to the signal processing circuit 140. The sampling signal from the output section 118d is supplied to the image processing circuit 150. A spare signal $S_{\#1}$ from the output section 118c and a spare signal $S_{\#2}$ from the output section 118e are spared.

The output signal condition setting section 113 which is controlled by the control section 101 sets pieces of condition setting information that determine operations for control of the digital delay type pulse control sections 114a to 114e, selection of the selection sections 116a to 116e, blanking control of the blanking sections 117a to 117c, and the output enable functions of the output sections 118a to 118e.

The digital delay type pulse control section 114a is "digital delay type reset signal generating means" in claims. The digital delay type pulse control section 114b is "digital delay type clamp signal generating means" in claims. The digital delay type pulse control section 114c is "digital delay type CDD spare signal generating means" in claims. The digital delay type pulse control section 114d is "digital delay type sampling signal generating means" in claims. The digital delay type pulse control section 114e is "digital delay type CCD spare signal generating means" in claims.

Note that FIG. 1 partially illustrates signal lines indicated by one-directional arrows, but each signal can also be bidirectional.

Figure 2:
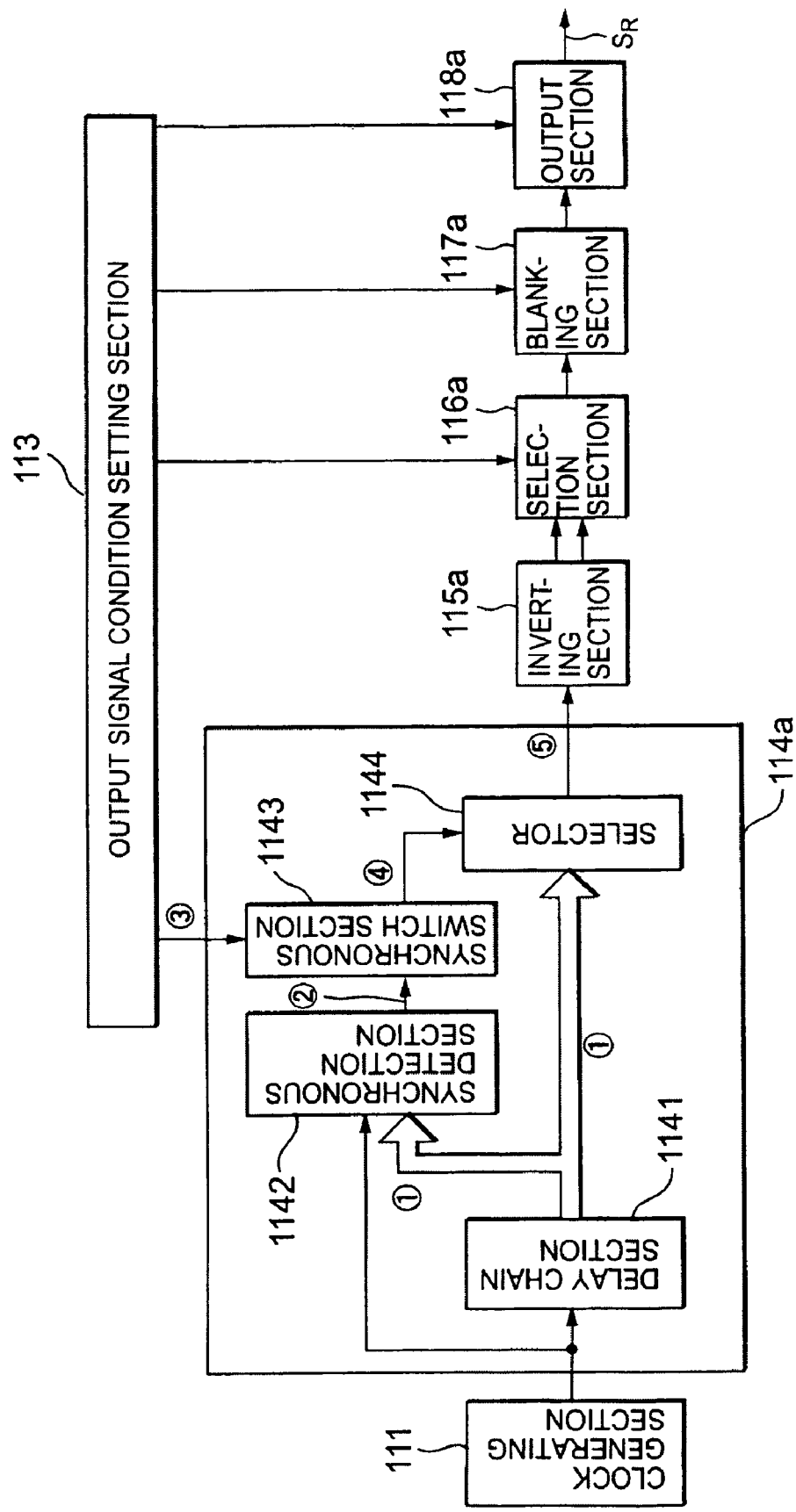
FIG. 2 is a block diagram showing the electrical arrangement of main part in the embodiment of the CCD pulse generator according to the present invention.

FIG. 2 is a block diagram showing the internal arrangement of the digital delay type pulse control section 114a and a partial arrangement representing the relationship between the output signal condition setting section 113 and the inverting section 115a to output section 118a. The same arrangement also applies to the digital delay type pulse control sections 114b to 114e.

The features of the embodiment will be sequentially explained in (A), (B), (C), and (D) by mainly exemplifying the arrangement and operation of the digital delay type pulse control section 114a shown in FIG. 2.

(A) Delay Signal Generation:

A delay chain section 1141 is a delay element group for delaying an input signal (reference clock from the clock generating section 111) and obtaining a plurality of delay signals (delay signal group: ① in FIG. 2) with slightly different phases.

The delay chain section 1141 is preferably constituted by cascade-connecting delay elements into a chain so as to obtain the number of stages capable of generating delay signals with slightly different phases for two cycles of the reference clock.

(B) Synchronous Detection:

A synchronous detection section 1142 is a detection section which receives a reference clock from the clock generating section 111 and detects the stage number (synchronous point) of a delay signal synchronized with the reference clock among the delay signal group (①in FIG. 2). The synchronous detection section 1142 outputs synchronous point information (② in FIG. 2). The synchronous detection section 1142 preferably outputs, among the delay signal group (①in FIG. 2), first synchronous point information SP1 which is first synchronized with the reference clock and second synchronous point information SP2 which is next synchronized with the reference clock. A plurality of delay signals from the delay chain section 1141 may vary in delay time under the influence of a temperature change or the like. The synchronous detection section 1142 detects the number of delay signals contained in a predetermined unvariable time (interval between a reference clock and the next reference clock).

(C) Synchronous Switch:

A synchronous switch section 1143 obtains a synchronous correction amount on the basis of synchronous point information (② in FIG. 2) from the synchronous detection section 1142 and a timing setting signal (③ in FIG. 2) from the output signal condition setting section 113. The synchronous switch section 1143 outputs a selection signal (④ in FIG. 2) representing which delay signal with a given phase is to be selected from the delay signal group (① in FIG. 2). The timing setting signal is a setting signal for setting rise and fall timings.

(D) Delay Signal Selection:

A selector 1144 receives a selection signal (④ in FIG. 2) from the synchronous switch section 1143, selects a delay signal with a corresponding phase from the delay signal group (① in FIG. 2), and outputs the selected delay signal as a reset signal (⑤ in FIG. 2).

In this manner, a reset signal $S_R$ having desired rise and fall timings is generated. The reset signal $S_R$ has been exemplified, and the same operation also applies to the clamp signal $S_C$, sampling signal $S_S$, and spare signal.

The waveform of a one-pixel image signal shown in FIG. 6 is output in synchronism with the transfer signal $S_T$ from the clock generating section 111. That is, a delay signal with a stage number corresponding to a desired generating timing of a delay signal whose delay state is grasped is selected using the output timing of the transfer signal $S_T$ as a reference. A CCD driving signal and CCD output processing signal which rise and fall at desired timings can be accurately generated Accordingly, a pulse with a desired timing can be obtained in the image stabilization period shown in FIG. 6.

That is, for example, a reset signal $S_R$ having desired rise and fall timings is generated not by preparing and selecting expensive analog delay elements, but by selecting, at a predetermined timing, a delay signal whose phase (pulse position or timing of a dot clock) is finely changed.

In the embodiment, even if the delay time of one delay element of the delay chain section 1141 changes due to heat, an individual difference, or the like, which delay signal on a given stage is to be selected is determined from a synchronous stage number and a desired timing without any influence of an individual difference or a change over time. As a result, rise and fall at desired timings can be selected.

The technique for the digital delay type pulse control section can be the technique of a signal delay apparatus which has separately been filed as Japanese Patent Application No. 5-12549 by the present inventor.

<Features of Embodiment>The operation features of the image reading apparatus 100 which adopts the CCD pulse generator 110 in the embodiment will be described in (1) to (15) with reference to FIG. 1.

(1) In the embodiment, a CCD reset signal $S_R$ corresponding to set rise and fall timings is generated by the digital delay type pulse control section 114a by finely delaying the transfer signal $S_T$ for driving a CCD, generating a plurality of delay signals, and changing selection of these delay signals.

The inverted signal and non-inverted signal of the CCD reset signal $S_R$ that are generated by the inverting section 115a are selected by the selection section 116a in accordance with settings from the output signal condition setting section 113. The CCD reset signal $S_R$ is temporarily disabled by the blanking section 117a in accordance with the settings of the output signal condition setting section 113. The reset signal $S_R$ is output from the output section 118a via the output enable function under the control of the output signal condition setting section 113. Pieces of condition setting information which determine. these operations are set by the output signal condition setting section 113.

The CCD reset signal $S_R$ serving as a CCD driving signal can be generated at an accurate timing. When CCDs of the same type are commonly adopted for high- to low-speed reading apparatuses and large part of the circuit arrangement is kept unchanged, a common timing setting circuit and common circuit can be used.

(2) In the embodiment, a CCD clamp signal $S_C$ corresponding to set rise and fall timings is generated by the digital delay type pulse control section 114b by finely delaying the transfer signal $S_T$ for driving a CCD, generating a plurality of delay signals, and changing selection of these delay signals.

The inverted signal and non-inverted signal of the CCD clamp signal $S_C$ that are generated by the inverting section 115b are selected by the selection section 116b in accordance with settings from the output signal condition setting section 113. The CCD clamp signal $S_C$ is temporarily disabled by the blanking section 117b in accordance with the settings of the output signal condition setting section 113. The clamp signal $S_C$ is output from the output section 118b via the output enable function under the control of the output signal condition setting section 113. Pieces of condition setting information which determine these operations are set by the output signal condition setting section 113.

The CCD clamp signal $S_C$ serving as a CCD output processing signal (signal processing signal) can be generated at an accurate timing. When CCDs of the same type are commonly adopted for high- to low-speed reading apparatuses and large part of the circuit arrangement is kept unchanged, a common timing setting circuit and common circuit can be used.

(3) In the embodiment, a CCD spare signal $S_{\#1}$ corresponding to set rise and fall timings is generated by the digital delay type pulse control section 114c by finely delaying the transfer signal $S_T$ for driving a CCD, generating a plurality of delay signals, and changing selection of these delay signals.

The inverted signal and non-inverted signal of the CCD spare signal $S_{\#1}$ that are generated by the inverting section 115c are selected by the selection section 116c in accordance with settings from the output signal condition setting section 113. The CCD spare signal $S_{\#1}$ is temporarily disabled by the blanking section 117c in accordance with the settings of the output signal condition setting section 113. The spare signal $S_{\#1}$ is output from the output section 118c via the output enable function under the control of the output signal condition setting section 113. Pieces of condition setting information which determine these operations are set by the output signal condition setting section 113.

The CCD spare signal $S_{\#1}$ can be generated at an accurate timing. When CCDs of the same type are commonly adopted for high- to low-speed reading apparatuses and large part of the circuit arrangement is kept unchanged, a common timing setting circuit and common circuit can be used.

(4) In the embodiment, a CCD sampling signal $S_S$ corresponding to set rise and fall timings is generated by the digital delay type pulse control section 114d by finely delaying the transfer signal $S_T$ for driving a CCD, generating a plurality of delay signals, and changing selection of these delay signals.

The inverted signal and non-inverted signal of the CCD sampling signal $S_S$ that are generated by the inverting section 115d are selected by the selection section 116d in accordance with settings from the output signal condition setting section 113. The sampling signal $S_S$ is output from the output section 118d via the output enable function under the control of the output signal condition setting section 113. Pieces of condition setting information which determine these operations are set by the output signal condition setting section 113.

The CCD sampling signal $S_S$ serving as a CCD output processing signal (image processing signal) can be generated at an accurate timing. When CCDs of the same type are commonly adopted for high- to low-speed reading apparatuses and large part of the circuit arrangement is kept unchanged, a common timing setting circuit and common circuit can be used.

(5) In the embodiment, another CCD spare signal $S_{\#2}$ corresponding to set rise and fall timings is generated by the digital delay type pulse control section 114e by finely delaying the transfer signal $S_T$ for driving a CCD, generating a plurality of delay signals, and changing selection of these delay signals.

The inverted signal and non-inverted signal of the CCD spare signal $S_{\#2}$ that are generated by the inverting section 115e are selected by the selection section 116e in accordance with settings from the output signal condition setting section 113. The spare signal $S_{\#2}$ is output from the output section 118e via the output enable function under the control of the output signal condition setting section 113. Pieces of condition setting information which determine these operations are set by the output signal condition setting section 113.

The CCD spare signal $S_{\#2}$ can be generated at an accurate timing. When CCDs of the same type are commonly adopted for high- to low-speed reading apparatuses and large part of the circuit arrangement is kept unchanged, a common timing setting circuit and common circuit can be used.

By arranging the spare signal circuit, it can be used when an additional signal is necessary in changing the function of a CCD or the like. This can enhance the circuit versatility.

(6) In the embodiment, the output signal condition setting section 113 is desirably. comprised of a register which is controlled by three, data, clock, and load control signals. This arrangement allows exchanging necessary data with the control section 101 and the like by serial communication. A simple arrangement can increase the reliability.

Figure 3:
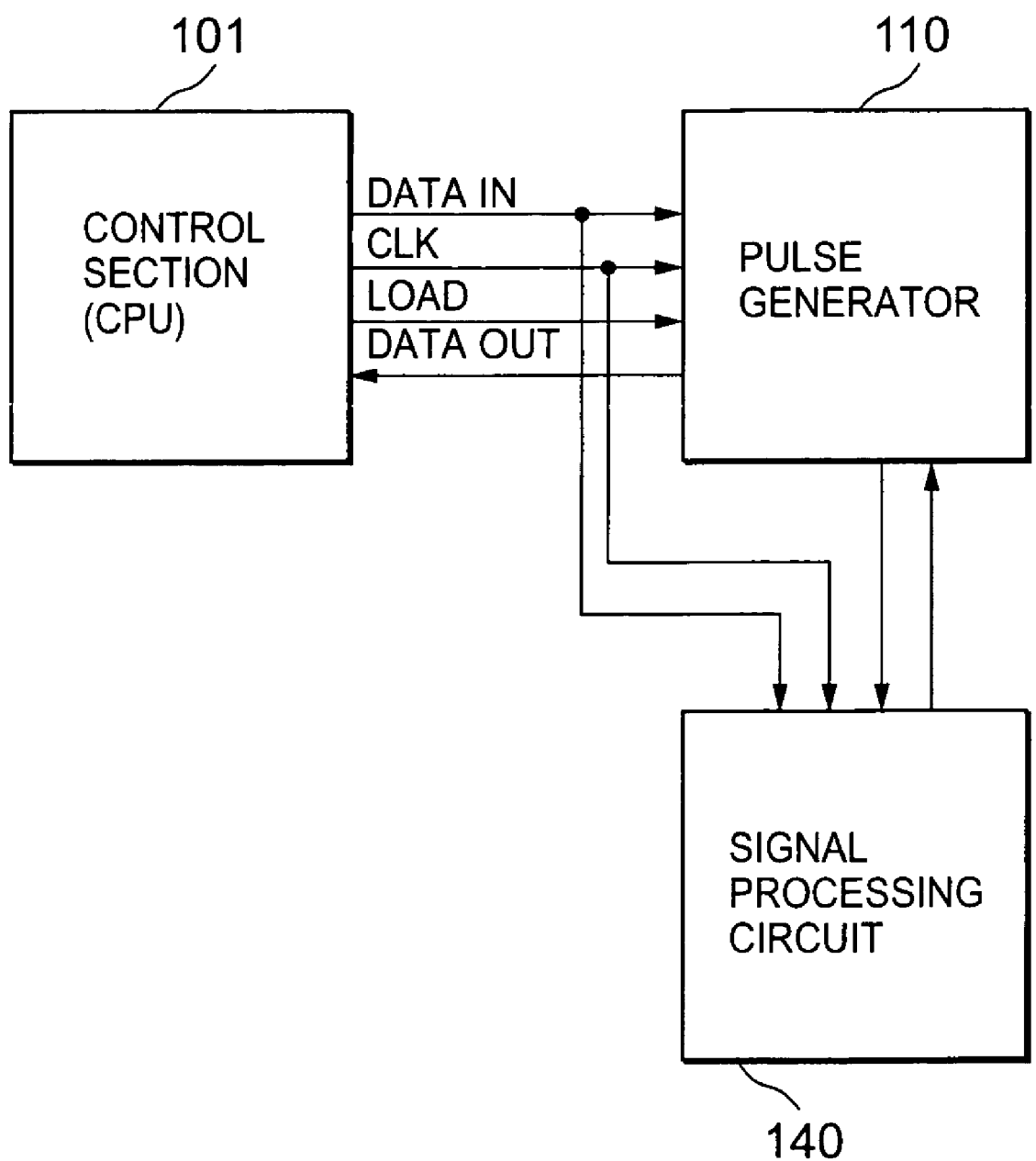
FIG. 3 is a block diagram showing a connection state in the CCD pulse generator according to the present invention.

FIG. 3 is a block diagram schematically showing the connection state. FIG. 3 shows the connection states of data (DATA IN and DATA OUT), clock (CLK), and load (LOAD) from the control section 101. In the pulse generator 110, the output signal condition setting section 113 in the pulse generator 110 exchanges the data, clock, and load signals with the control section 101.

Figure 4:
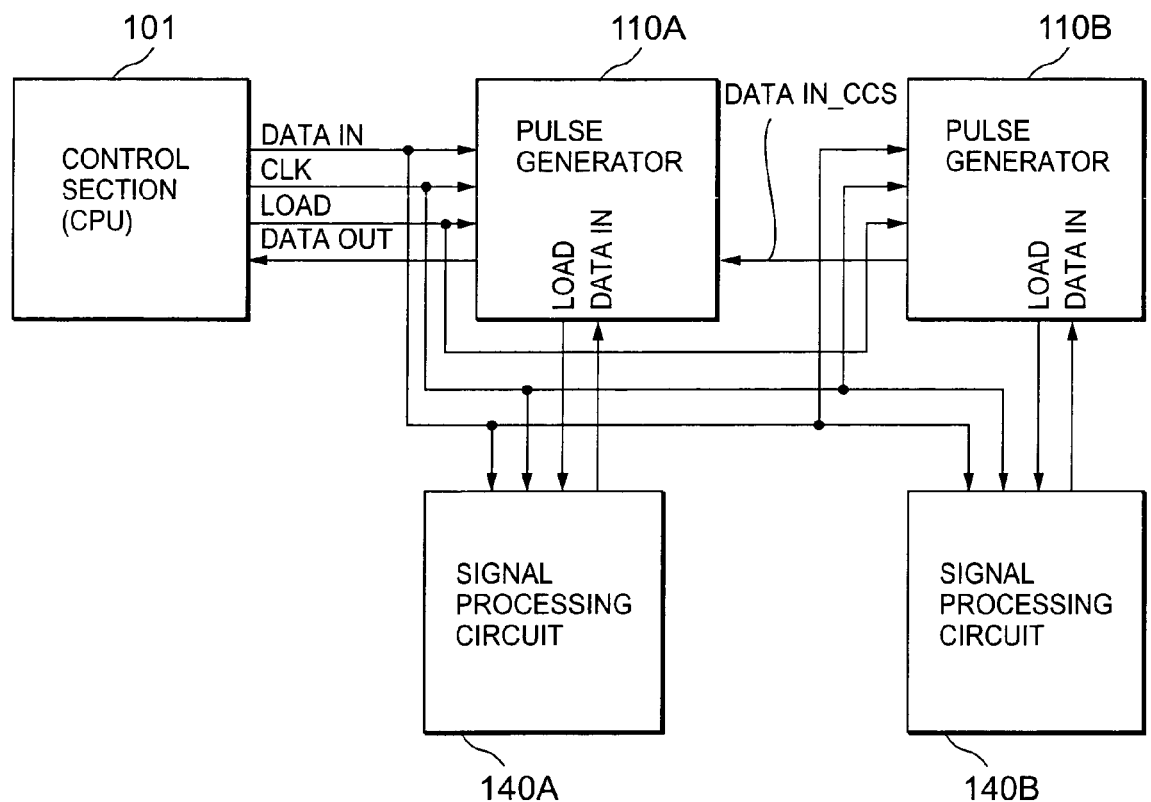
FIG. 4 is a block diagram showing another connection state in the CCD pulse generator according to the present invention.

In this connection, a plurality of pulse generators 110A and 110B as shown in FIG. 4 can also be cascade-connected to the control section 101.

(7) In the embodiment, when the output signal condition setting section 113 is comprised of a register which is controlled by three, data, clock, and load control signals, and the pulse generator 110 can exchange necessary data with the control section 101 or another functional element unit (not shown) of the same type by serial communication, the reliability can be increased by a simple arrangement. In this case, CCD pulse generators are desirably cascade-connected to each other.

(8) In the embodiment, the register of the output signal condition setting section 113 in (6) or (7) is desirably controlled via a terminal for selecting an element operation order. This arrangement can determine the parentage (master/slave) relationship and operation order when a plurality of CCD pulse generators are cascade-connected to each other.

The element operation order selection terminal is desirably set by H or L. In the example of FIG. 5, an element operation order selection terminal CS of the pulse generator 110A is set at H level, and set as a parent. An element operation order selection terminal CS of the pulse generator 110B is set at L level, and set as a child. An ID may also be set by a combination of H and L using not one element operation order selection terminal CS, but two or more signal lines.

(9) In the embodiment, the register of the output signal condition setting section 113 in (6) or (7) is desirably controlled via a terminal for enable selection. When a plurality of CCD pulse generators are cascade-connected to each other, this arrangement desirably allows setting whether to enable or disable each CCD pulse generator. The enable selection terminal is desirably set by H or L.

The enable selection terminal is desirably set by H or L. In the example of FIG. 5, an enable selection terminal CS of the pulse generator 110A is set at H level, and enabled. An enable selection terminal CS of the pulse generator 110B is set at L level, and disabled.

(10) In the embodiment, the output signal condition setting section 113 is comprised of a register which is controlled by three, data, clock, and load control signals. This arrangement allows exchanging necessary data with the control section 101 and another setting unit (not shown) by serial communication. A simple arrangement can increase the reliability.

(11) In the embodiment, the respective sections in (1) to (5) and the output signal condition setting section 113 in (6) are desirably constituted as a digital circuit in one chip of a semiconductor integrated circuit. The sections in one chip of the semiconductor integrated circuit can simplify the arrangement, reducing the circuit area. The sections are integrated in the same chip, and their thermal conditions become equal, easily ensuring high precision.

(12) The embodiment provides a pulse generator unit which is formed by combining at least two of the pulse generators in (1) to (5) and obtains a plurality of outputs. All output enable functions are desirably simultaneously controlled by one setting. In the example of FIG. 1, all (1) to (5) are combined. Hence, simple control can realize high-reliability operation.

(13) In the embodiment, a transfer signal from the clock generating section 111 is desirably received by differential input units in the delay chain sections of the digital delay type pulse control sections 114a to 114e, thereby generating a plurality of delay signals. The transfer signal can therefore be received at an accurate timing without any influence of noise or the like.

(14) In the embodiment, the sections in (1) to (3) are arranged within one chip of an integrated circuit. In the blanking sections 117a to 117c, a blanking signal generated within the integrated circuit and a blanking signal input outside the integrated circuit are desirably set and selected by the output signal condition setting section 113. A CCD driving signal can be generated at an accurate timing, and also controlled using an external blanking signal, realizing various usages.

(15) In the embodiment, the pulse generators in (1) to (14) are so constituted as to generate a signal for driving a line CCD.

CCDs of the same type (line sensors) are commonly adopted for high- to low-speed reading apparatuses, and large part of the circuit arrangement is kept unchanged. However, no circuits have conventionally been common because of a change in the timing setting circuit. Even this arrangement can be commonly employed by applying the pulse generator of the embodiment. That is, line sensor type CCDs used in reading apparatuses such as a flatbed scanner, copying machine, and facsimile apparatus require different timings depending on the resolution used and the model used. An application of the pulse generator according to the embodiment can realize a common circuit arrangement.

<Another Embodiment>

The image reading apparatus 100 reads a monochrome image in the above description, but the present invention is not limited to this. The pulse generator can also be used in an image reading apparatus which reads a color image. In this case, CCD driving signals (CCD reset signal, CCD clamp signal, spare signal, and the like) and CCD output processing signals (sampling signal and the like) are generated for each color.

What is claimed is:

1. A CCD pulse generator comprising:
   a digital delay type CCD control signal generating section for finely delaying a transfer signal for driving a CCD, thereby generating a plurality of delay signals, and changing selection of the plurality of delay signals, thereby generating a CCD control signal corresponding to set rise and fall timings;
   an inverted/non-inverted signal generating section for generating an inverted signal and a non-inverted signal of the CCD control signal;
   a selection section for selecting the inverted signal and the non-inverted signal of the CCD control signal;
   an output section, having an output enable function, for outputting the signal selected by said selection section; and
   an output signal condition setting section for setting pieces of condition setting information that determine operations of said respective section, said output signal condition setting section being formed by a register which is controlled by data, clock, and load control signals.

2. The generator according to claim 1, wherein the CCD pulse generator further comprises a blanking section for temporarily disabling a CCD reset signal, wherein the CCD control signal includes the CCD reset signal.

3. The generator according to claim 1, wherein
   the CCD pulse generator further comprises a blanking section for temporarily disabling a CCD clamp signal, wherein the CCD control signal includes the CCD clamp signal.

4. The generator according to claim 1, wherein
   the CCD pulse generator further comprises a blanking section for temporarily disabling a CCD spare signal, wherein the CCD control signal includes the CCD spare signal.

5. The generator according to claim 1, wherein the CCD control signal includes a CCD spare signal.

6. The generator according to claim 5, further comprising a blanking section for temporarily disabling the CCD spare signal.

7. A CCD pulse generator comprising:
   a digital delay type sampling signal generating section for finely delaying a transfer signal for driving a CCD, thereby generating a plurality of delay signals, and changing selection of the plurality of delay signals, thereby generating a sampling signal for sampling a CCD output in synchronism with set rise and fall timings;
   an inverted/non-inverted signal generating section for generating an inverted signal and a non-inverted signal of a CCD control signal;
   a selection section for selecting the inverted signal and the non-inverted signal of the CCD control signal;
   an output section, having an output enable function, for outputting the signal selected by said selection section; and
   an output signal condition setting section for setting pieces of condition setting information that determine operations of said respective sections, said output signal condition setting section being formed by a register which is controlled by data, clock, and load control signals.

8. The generator according to claim 1, wherein said output signal condition setting section can be cascade-connected to another functional element section formed by a register which is controlled by data, clock, and load control signals.

9. The generator according to claim 1, wherein the register is controlled via a terminal for selecting an element operation order.

10. The generator according to claim 1, wherein the register is controlled via a terminal for element enable selection.

11. The generator according to claim 1, wherein the register is controlled via communication by a setting section including a CPU.

12. The generator according to claim 1, wherein said respective sections are arranged in one chip of an integrated circuit.

13. The pulse generator unit which is formed by combining at least two of pulse generators defined in claims 2, 3, 4, 5 or 6 and comprises a plurality of output sections, wherein all output enable functions of said output sections are simultaneously controlled by one setting.

14. The generator according to claim 1, wherein the transfer signal is received by a differential input section to generate the plurality of delay signals.

15. The generator according to claim 2, wherein
   said respective sections are arranged in one chip of an integrated circuit,
   said blanking section comprises an internal blanking signal generating section for generating a blanking signal within the integrated circuit, an external blanking signal input section for receiving a blanking signal outside the integrated circuit, and a blanking signal selection section for selecting the internal blanking signal and the external blanking signal, and
   selection of said blanking signal selection section is set by said output signal condition setting section.

16. The generator according to claim 1, wherein a signal for driving a line CCD is generated.

17. An image forming apparatus comprising:
a CCD;
a digital delay type CCD control signal generating section for finely delaying a transfer signal for driving said CCD, thereby generating a plurality of delay signals, and changing selection of the plurality of delay signals, thereby generating a CCD control signal corresponding to set rise and fall timings;
an inverted/non-inverted signal generating section for generating an inverted signal and a non-inverted signal of the CCD control signal;
a selection section for selecting the inverted signal and the non-inverted signal of the CCD control signal;
an output section, having an output enable function, for outputting the signal selected by said selection section; and
an output signal condition setting section for setting pieces of condition setting information that determine operations of said respective section, said output signal condition setting section being formed by a register which is controlled by three, data, clock, and load control signals.

18. The apparatus according to claim 17, wherein
the image forming apparatus further comprises a blanking section for temporarily disabling a CCD reset signal, and
the CCD control signal includes the CCD reset signal.

19. The apparatus according to claim 17, wherein
the image forming apparatus further comprises a blanking section for temporarily disabling a CCD clamp signal, and
the CCD control signal includes the CCD clamp signal.

20. The apparatus according to claim 17, wherein
the image forming apparatus further comprises a blanking section for temporarily disabling a CCD spare signal, and
the CCD control signal includes the CCD spare signal.

21. The apparatus according to claim 17, wherein the CCD control signal includes a CCD spare signal.

22. The apparatus according to claim 21, further comprising a blanking section for temporarily disabling the CCD spare signal.

* * * * *

UNITED STATES PATENT AND TRADEMARK OFFICE
CERTIFICATE OF CORRECTION

PATENT NO.         : 7,538,809 B2
APPLICATION NO.    : 10/780604
DATED              : May 26, 2009
INVENTOR(S)        : Kouichi Takaki et al.

It is certified that error appears in the above-identified patent and that said Letters Patent is hereby corrected as shown below:

In claim 1, column 11, line 56, "section," should read --sections,--.

In claim 17, column 13, line 22, "section," should read --sections,--.

Signed and Sealed this

Twenty-second Day of December, 2009

David J. Kappos
*Director of the United States Patent and Trademark Office*